United States Patent [19]

Chen et al.

[11] Patent Number: 5,495,582

[45] Date of Patent: Feb. 27, 1996

[54] SYSTEM AND METHOD FOR INTERPROCESSOR ROUTING THROUGH AN ESTABLISHED COMMUNICATION SESSION IN A LOOSELY COUPLED COMPUTER COMPLEX

[75] Inventors: Shawfu Chen, New Milford; Mark R. Gambino, Danbury, both of Conn.

[73] Assignee: International Business Machines Corporation, Armonk, N.Y.

[21] Appl. No.: 978,217

[22] Filed: Nov. 18, 1992

[51] Int. Cl.⁶ .................................................. H01J 13/00
[52] U.S. Cl. .............................. 395/200.12; 364/240.8; 364/DIG. 1
[58] Field of Search ....................... 395/800, 275, 395/200; 364/240.8, DIG. 1

[56] References Cited

U.S. PATENT DOCUMENTS

| | | | |
|---|---|---|---|
| 4,586,134 | 4/1986 | Norstedt | 395/200 |
| 4,949,254 | 8/1990 | Shorter | 395/700 |
| 4,972,437 | 11/1990 | Citron et al. | 375/37 |
| 4,975,914 | 12/1990 | Ashton et al. | 371/11.2 |
| 4,999,771 | 3/1991 | Ralph et al. | 395/325 |
| 5,021,949 | 6/1991 | Morten et al. | 395/200 |
| 5,027,269 | 6/1991 | Grant et al. | 395/650 |

FOREIGN PATENT DOCUMENTS

0490801A2  6/1992  European Pat. Off. .

*Primary Examiner*—Alyssa H. Bowler
*Assistant Examiner*—John Harrity
*Attorney, Agent, or Firm*—William A. Kinnaman, Jr.

[57] ABSTRACT

A system and method for allowing communications sessions to be established between two or more computer processors and a remote terminal in a communications network where only one host to terminal session may be created. The system allows processors in a loosely coupled processor complex to determine whether another of the processors has an existing communications session with the requested remote device. If so, any new request for a communications session with that remote device will be routed through the processor with the established link. The interprocessor routing uses service transaction programs within each of the processors in a loosely coupled complex to establish the required communications sessions and to serve as an intermediary for passing messages between the requesting host and the remote device.

21 Claims, 6 Drawing Sheets

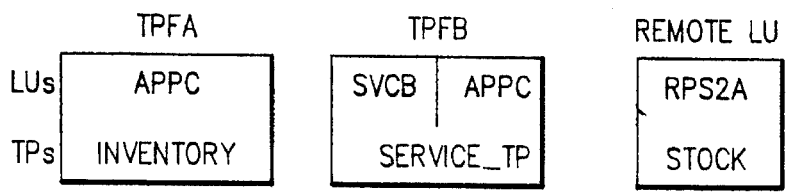

```
        TPFA              TPFB          REMOTE LU
LUs |   APPC    |   | SVCB | APPC  |   |  RPS2A  |
TPs | INVENTORY |   |  SERVICE_TP  |   |  STOCK  |

1   ALLOCATE
    TPN=STOCK
    SYNC=NONE
    LUNAME=RPS2A
    MODE=MODE1
    .
    .
2   .         ALLOCATE
    .         TPN=SERVICE_TP,
    .         SYNC=CONFIRM,
    .         LUNAME=SVCB,
    .         MODE=SERVMODE
    .         <RC=OK>
    .         <RESID=1>
    .
3   .         SEND_DATA
    .         RESID=1
    .         <RC=OK>
    .
4   .         CONFIRM
    .         RESID=1
    .             BB,FMH5,data,DR2
    .             =-=-=-=-=-=-=-=-=->
    .
5   .         .             TP ACTIVATED
    .         .
6   .         .             RECEIVE
    .         .             RESID=1
    .         .             <RC=OK>
    .         .             <WHATRCV=DATA_COMPLETE>
    .         .
7   .         .             ALLOCATE
    .         .             TPN=STOCK
    .         .             SYNC=NONE
    .         .             LUNAME=RPS2A
    .         .             MODE=MODE1
    .         .             <RC=OK>
    .         .             <RESID=2>
    .         .
```

FIG.4A

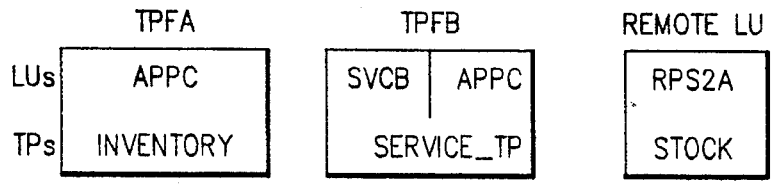

```
         TPFA          TPFB         REMOTE LU
    LUs  APPC      SVCB | APPC        RPS2A
    TPs  INVENTORY    SERVICE_TP      STOCK

8   .      .        RECEIVE
     .      .        RESID=1
     .      .        <RC=OK>
     .      .        <WHATRCV=CONFIRM>
     .      .
     .      .        <RC=OK>
     .      .        <RESID=1>
     .      .
     .      .              RESID=1
     .      .   +DR2     .
     .      .  <-=-=-=-=-=-=-=
     .    <RC=OK>     <RC=OK>
    <RC=OK>
    <RESID=1>
10   .      .        RECEIVE
     .      .        RESID=1
11 SEND_DATA         .
   <RESID=1>         .
   <RC=OK>           .
                     .
12 RECEIVE           .
   RESID=1           .
     .    data,CD    .
    .=-=-=-=-=-=-=->  <RC=OK>
     .               <WHATRCV=DATA_COMPLETE>
     .
13   .               SEND_DATA
     .               RESID=2
     .               <RC=OK>
     .
14   .               RECEIVE
     .               RESID=1
     .               <RC=OK>
     .               <WHATRCV=SEND>
15   .               PREPARE_TO_RECEIVE
     .               RESID=2
     .               TYPE=FLUSH
     .                     BB,FMH5,data,CD
     .               ---------------------->
     .               <RC=OK>
```

FIG.4B

|  | TPFA | TPFB | REMOTE LU |
|---|---|---|---|
| LUs | APPC | SVCB \| APPC | RPS2A |
| TPs | INVENTORY | SERVICE_TP | STOCK |

```
16 .                                              TP ACTIVATED
    .
    .
17 .            RECEIVE
    .           RESID=2
    .
    .
18 .            .                                 RECEIVE
    .           .                                 RESID=2
    .           .                                 <RC=OK>
    .           .                                 <WHATRCV=DATA_COMPLETE>
    .           .
19 .            .                                 SEND_DATA
    .           .                                 RESID=2
    .           .                                 <RC=OK>
20 .            .                                 DEALLOCATE
    .           .                                 RESID=2
    .           .                                 TYPE=SYNC
    .                      data,CEB
    .               <----------------
    .           <RC=OK>                <RC=OK>
    .           <WHATRCV=DATA_COMPLETE>
    .
21 .            SEND_DATA
    .           RESID=1
    .           <RC=OK>
    .
22 .            RECEIVE
    .           RESID=2
    .           <RC=DEALLOCATE_NORMAL>
    .
23 .            DEALLOCATE
    .           RESID=1
    .           TYPE=FLUSH
    .   data,CEB    .
    .  <=-=-=-=-=-=
    .           <RC=OK>
    .
```

FIG.4C

24 .
. DEALLOCATE
. RESID=2
. TYPE=LOCAL
. <RC=OK>

25 <RC=OK>
<WHATRCV=DATA_COMPLETE>

26 RECEIVE
RESID=1
<RC=DEALLOCATE_NORMAL>

27 DEALLLOCATE
RESID=1
TYPE=LOCAL
<RC=OK>

SYSTEM AND METHOD FOR INTERPROCESSOR ROUTING THROUGH AN ESTABLISHED COMMUNICATION SESSION IN A LOOSELY COUPLED COMPUTER COMPLEX

BACKGROUND OF THE INVENTION

1. Field of the Invention

The present invention relates generally to data processing systems and more particularly to data processing systems for communicating between a number of host computer systems and remote terminals. The present invention still more particularly is related to communications between a loosely coupled complex of host computers and remote terminal devices using the System Network Architecture (SNA) protocol.

2. Background and Related Art

Data processing systems are frequently employed within enterprises to maintain data needed in different locations throughout that enterprise. The data may be maintained in one or more host systems linked to terminals at remote sites by a communications network. Communications between a remote terminal and the central host systems operates according to a "protocol" or set of communication rules. The communications protocol typically exists as part of a teleprocessing architecture that defines the function and structure of data communications products.

One of the more popular teleprocessing architectures is the IBM System Network Architecture (SNA). SNA was first introduced in 1974 and has been enhanced several times since then. SNA is a top down structured design composed of layers (see e.g. *SNA Technical Overview*, IBM Order No. GC30-3073.).

A location in the SNA network that supports one or more ports for communication over the network is defined as a Network Addressable Unit (NAU). SNA defines three types of network addressable units: a System Services Control Point (SSCP) used for network management; a Physical Unit (PU) containing configuration related information for a particular node; and a Logical Unit (LU) that provides end user or application access to the SNA network. The present invention is concerned primarily with host applications (residing in either a PU5 or PU2.1 node) communicating with remote applications (in a PU5 or PU2.1 node) or remote terminals (in a PU2 or PU2.1 node) in the SNA network. Each physical unit is designated by numerical type in the SNA standard, thus PU5, PU2, and PU2.1 define different physical unit types.

SNA defines the architecture for teleprocessing and is embodied in networking software products such as the IBM Virtual Telecommunications Access Method (VTAM) product that operates on the IBM System/370 and System/390 hardware architectures (IBM, and System/370 and System/390 are trademarks of the IBM Corp.)

SNA is operable on multiple host networks as described in "SNA Multiple-System Networking", *IBM Systems Journal*, 18, 263–297 (1979). This article describes the process through which a terminal can access an application on one or more hosts and through which host inter-processor sessions can be established.

The multiple host design described in the above article comprises independent host computer systems. A different communication problem arises in loosely coupled processor complexes. Loosely coupled complexes consist of a number of processors that share data storage and communications networks but do not share main memory. Each processor in the complex can access all data on the shared databases and can run any application program stored in the data storage. This allows the presentation of a single image to the remote user and allows workload balancing by the processor complex. However, the systems cannot exchange information using shared memory techniques. The remote user does not care which of the coupled processors executes the application, allowing more effective workload balancing without operator or end user action.

An application running on a host system will be associated with a Logical Unit (LU) on that system. The remote user will establish an SNA session between the remote terminal Logical Unit (LU) and the host LU. A particular application will appear as the same LU in each host system in which it is running because it is started from the same data storage image and must respond to remote terminal requests that do not know of the separate processors. This creates problems, however, when an application in another processor of the complex desires to establish a communication session with the remote terminal. The problem is due to an SNA restriction that prohibits a remote user from being in session with the same Logical Unit (LU) in multiple processors in a complex. Any session requested by the remote terminal is automatically routed to the host processor with which a session already exists. However, when a different host processor attempts to establish a session with the remote terminal the session request will fail. Thus, under the current system, only one processor in a complex can be in conversation with a remote user.

The SNA restriction permitting only one host processor to be in communication with one remote terminal creates a problem for systems in which workload is balanced by having certain applications operate on less than all of the processors in a complex. This also creates a problem for applications that initiate communication from the host rather than relying on the remote terminal to establish the sessions.

SUMMARY OF THE INVENTION

It is therefore an object of the present invention to provide a system and method that allows any processor in a loosely coupled complex to establish communications with any terminal connected to the complex regardless of previously established terminal/host sessions.

It is a further object of the invention to provide a system and method that allows establishment of host/terminal sessions without terminal knowledge or action to select a particular host processor.

It is yet another object of the invention to provide a system and method for establishing host/terminal sessions without deviating from established SNA protocols.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIGS. 4a–4d illustrate the flow of commands between system components according to the preferred embodiment of the present invention.

DETAILED DESCRIPTION

Figure 1:
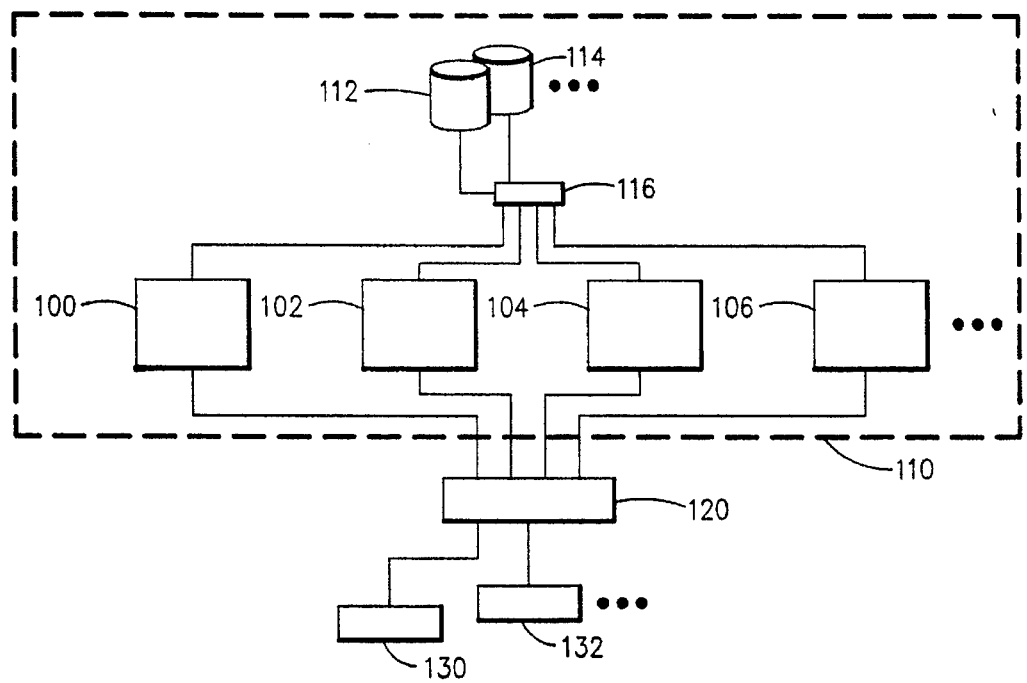
FIG. 1 is a block diagram of a loosely coupled processor complex in which the present invention is implemented.

A loosely coupled processor complex is shown generally as 110 in FIG. 1. The complex comprises a number of computer systems 100 102 104 106, data storage devices 112 114 and a data storage controller 116. The processors are each a complete system such an IBM ES/9000 computer system, having memory, one or more processing elements, and input/output channels (ES/9000 is a trademark of the IBM Corp.). A loosely coupled complex can have two or more connected systems with eight connected systems being a typical number. The computer systems 100 102 104 106 share access to data storage devices 112 114 through shared controllers 116. The controllers may be any type such as the IBM 3990 Disk Control Unit. Similarly, disk units can be IBM 3990 Disk Storage Units or like devices.

The loosely coupled complex is connected through communications controller 120 to remote devices 130 132. The communications controller may be any controller capable of running an SNA compliant communications program such as VTAM. In the preferred embodiment, the controller is an IBM 37×5 Communications Controller running the Network Control Program (NCP) and controlled by the VTAM application program.

Remote devices 130 132 can be any type of intelligent terminal such as an IBM PS/2 Personal Computer (PS/2 is a trademark of IBM Corp.) or can be a communications controller or gateway controlling a number of terminals. The remote devices must be capable of running a communications program to communicate with the host system.

Figure 2:
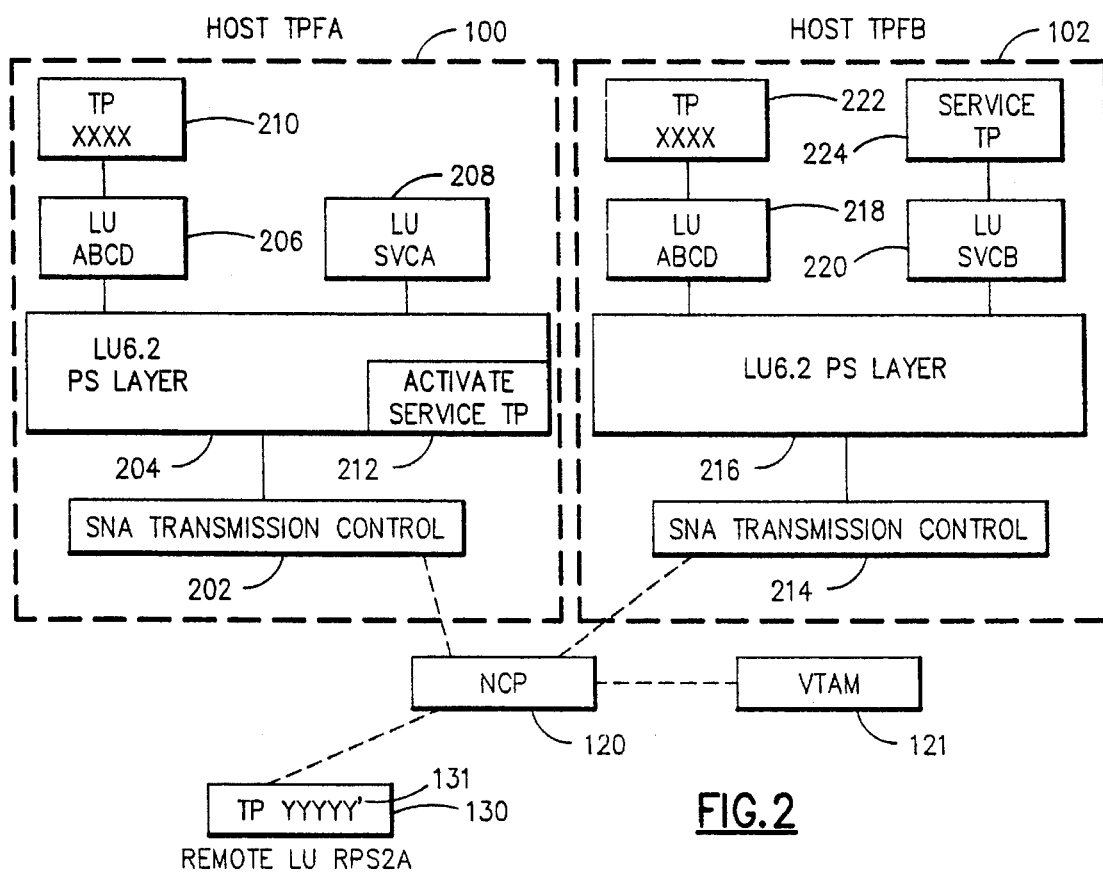
FIG. 2 is a block diagram of the system of communications according to the present invention.

FIG. 2 depicts the internal application structure of two of the computer systems 100 102 in the complex 110 shown in FIG. 1. The SNA LU6.2 protocol is used for communications between any two logical units in the loosely coupled complex or between the complex and the remote devices. LU6.2 defines the protocol for communication between logical units on a peer to peer basis (see SNA Transaction Programmer's Reference Manual for LU Type 6.2, IBM Order No. GC30-3084, and SNA LU6.2 Reference: Peer Protocols, IBM Order No. SC31-6808 for more information on LU6.2). In LU6.2 terminology, Applications are referred to as "Transaction Programs" (TP) and a conversation is a connection between 2 TPs. A conversation requires the use of a session. A session is a connection between 2 LUs. When starting a conversation the system checks to see whether there is an available session (i.e., a session not being used by a conversation), if not, a new session is established.

Host processor "TPFA" 100 is connected to communications controller 120 by "SNA Transmission Control" 202. SNA Transmission Control 202 manages the low level communications protocol tasks. SNA Presentation Services (PS) 204 controls the interface between the logical units 206 208 and the transmission control 202. Application or Transaction Program "XXXX" 210 operates in logical unit 206 and communicates with remote devices through the lower layers of the SNA communications architecture.

Host processor "TPFB" 102 has analogous components, namely SNA Transmission Control 214, SNA Presentation Services (PS) 216, logical units 218 220, and applications or transaction programs 222 224. The logical units 206 and 218 are both "ABCD" and the transaction programs 210 and 222 are both "XXXX" because of the shared data storage. A remote device requesting connection to logical unit "ABCD" and transaction program "XXXX" would be connected to either TPFA 100 or TPFB 102 depending on the workload of each processor. The resulting session would be indistinguishable to the remote device. The remote logical unit considers the loosely coupled complex to be a single logical unit (a single image) rather than separate hosts.

Remote device 130 may be designated as logical unit "RPS2A" and may request connection to a transaction program in LU ABCD. The request would flow to NCP in controller 120 that would use the VTAM routing tables 121 to determine the route to an appropriate host. Either TPFA or TPFB will satisfy the request but, for purposes of explanation, assume TPFB is chosen. The SNA LU6.2 protocol allows multiple (parallel) sessions to exist between two logical units. However, a remote logical unit may not have sessions with logical units of the same name on different systems within the loosely coupled complex. This limitation is imposed because the LU6.2 protocol requires each logical unit to exchange session limit information with the other logical unit. This information and the session control block information is not shared among the hosts in a loosely coupled complex. Therefore, once LU RPS2A device 130 has established a communications session with LU ABCD 218 on host TPFB, then all sessions between remote device 130 and LU ABCD must be routed to host TPFB 102.

The limitation on sessions between a remote device 130 and the loosely coupled complex does not present a problem as long as all sessions are originated by remote device 130. However, if a host transaction program in a different host attempts to initiate a session with the remote unit it may fail. For example, without the system and method of the present invention, if TP XXXX 210 in logical unit ABCD 206 attempts to initiate a session with remote device 130 it will fail, because remote device 130 may communicate only with logical unit ABCD in host TPFB 102.

The present invention prevents session failure by modifying the presentation services in each host and by adding a unique service logical unit and service transaction program to each host. The LU6.2 Presentation Services layer 204 216 is modified by adding a function to "Activate Service TP" 212. A similar function is added to Presentation Services 216 and to the Presentation Services in all other computer systems in the complex. The Activate Service TP 212 intercepts each request to establish a session with a remote device and tests to determine whether or not a session between that remote device and another system in the complex already exists. If a session exists, the Service TP in the other system is used to establish communication with the remote device. The Presentation Services modification is the same in all systems in the complex. Each Service TP, however, is a unique addressable LU in the respective host.

Figure 3:
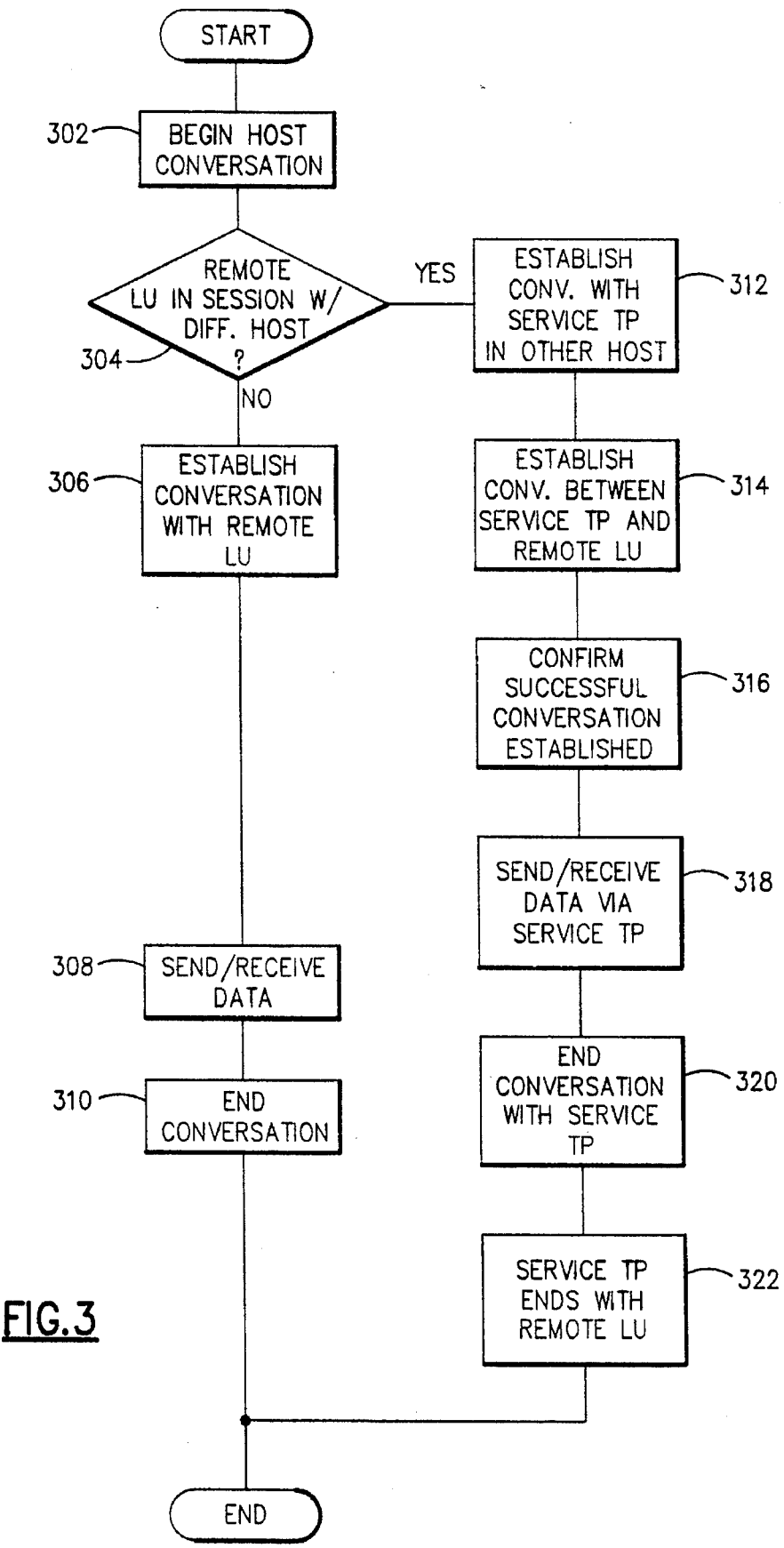
FIG. 3 is a flowchart depicting the logic employed in establishing a communication session between one of the processors in a loosely coupled complex and a remote device according to the present invention.
Figure 4D:
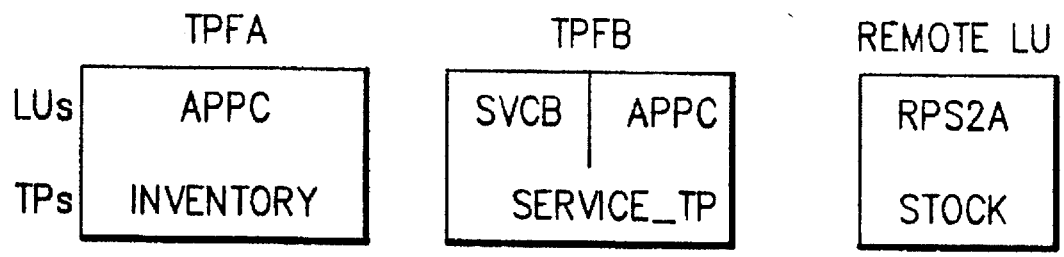

The system operates generally according to the process shown in FIG. 3. A host, e.g. XXXX 210, in host TPFA 100. seeks to begin a conversation 302 with a TP remote device, e.g. TP YYYY 131 in remote LU RPS2A 130. In SNA LU6.2 this is accomplished by issuing an ALLOCATE verb specifying $LU_{13}NAME=RPS2A$ and TPN=YYYY. Presentation Services 204 processes the ALLOCATE verb and detects 304 the existence of another host session with LU RPS2A, i.e. with TPFB 102. The preferred embodiment detects existing sessions by checking a session record shared among the systems in the loosely coupled complex via data storage. The session record contains a list of all remote LUs and the host with which they have a session(s), if any.

If Presentation Services 204 determines there are no existing remote session(s) between remote LU RPS2A 130 and another host 102 104 106, then it proceeds to establish a remote session 306 in the normal way by establishing a session between LU ABCD 206 and remote LU RPS2A 130. Data can be sent or received over this session 308 and the session will be terminated 310 when complete.

Detection of an existing remote session causes the "Activate Service TP" 212 to be activated. Activate Service TP establishes a conversation with the service TP in the host with the existing remote session(s), in this case Service TP 224 in host TPFB. This session is established by causing the Activate Service TP 212 to issue an ALLOCATE verb specifying $LU_{13}NAME=SVCB$ (assuming SVCB is the name of the service LU in TPFB) and $TPN=SERVICE_{13}TP$, where $SERVICE_{13}TP$ is the name of transaction program 224. When the allocate completes, a conversation has been started between the "Activate Service TP" 212 in TPFA and Service TP 224 in TPFB. "Activate Service TP" then passes the parameters from the original ALLOCATE request to Service TP 224 using a $SEND_{13}DATA$ verb.

Service TP 224 next establishes a session 314 with the remote LU, in this case RPS2A in remote device 130. It does this by issuing an ALLOCATE verb using the parameters transferred from TPFA. This ALLOCATE will be successful since TPFB already has a session(s) established with that remote LU. Service TP 224 will then have two conversations established, one via Activate Service TP 212 with host TP XXXX 210 in host TPFA 100 and one with TP YYYY 131 in remote LU RPS2A 130.

Service TP 224 will send TPFA a CONFIRMED reply indicating successful establishment 316 of a conversation with the remote TP. The Activate Service TP component will echo confirmation back to the Presentation Services that will in turn signal the Transaction Program originally requesting the ALLOCATE (TP XXXX 210) that its conversation has been established.

The two conversations with the Service TP 224 of TPFB allow a TP in host TPFA to communicate with a TP in remote LU RPS2A using LU6.2 protocols. This is transparent to both the TP in TPFA and the TP in RPS2A. Any data sent from TP in TPFA is routed to Service TP 224 which echoes the data 318 to the RPS2A via the conversation with that remote TP. Data sent by the TP in RPS2A is similarly echoed 318 to the TP in TPFA.

The conversation is terminated by the Transaction Program in host TPFA 320 by issuing a DEALLOCATE verb. The Service TP 224 passes this DEALLOCATE to the remote LU terminating the conversation 322 between Service TP 224 and remote TP 131.

The flow and detailed commands employed in the preferred embodiment are illustrated in FIGS. 4a through 4d. The application TP in TPFA has been given the name of INVENTORY and LU=APPC while the remote TP is named STOCK. The figures show the commands and the component issuing those commands.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for communicating between a plurality of computer logical devices, wherein the communications between said logical devices occurs over at least one communications session operating according to a communications protocol, said method comprising the steps of:

initiating a request from a first one of said plurality of logical devices to establish a communications session with a second one of said plurality of logical devices;

in response to said request, testing to identify any other logical device of said plurality of logical devices having an existing communications session with said second one of said plurality of logical devices;

in response to the failure to identify another logical device having an existing communications session with said second one of said plurality of logical devices, establishing direct communications between said first logical device and said second logical device; and in response to the identification of another logical device having an existing communications session with said second one of said plurality of logical devices, relaying messages between said first and second logical devices through said identified other logical device.

2. The method of claim 1 wherein the step of relaying messages between said first and second logical devices includes the steps of:

establishing a communications session between said first logical device and said other logical device;

establishing a communications session between said other logical device and said second logical device; and transmitting messages from said first logical device to said other logical device and from said other logical device to said second logical device and from said second logical device to said other logical device and thence to said first logical device.

3. The method of claim 2 wherein the step of testing to identify includes the steps of:

reading a data record shared by a subset of said plurality of logical devices; and testing said data record to determine which of said plurality of logical devices has an active session with said second logical device, if any.

4. The method of claim 3 wherein the communications protocol is Systems Network Architecture (SNA).

5. The method of claim 1 wherein said first logical device and said other logical device are loosely coupled processors.

6. The method of claim 1 wherein said second logical device is a remote device.

7. The method of claim 1 wherein said request originates from a first logical unit in said first logical device and said existing communications session is with another logical unit in said other logical device, said first logical unit and said other logical unit having a common logical unit name.

8. The method of claim 1 wherein said relaying step comprises the steps of:

establishing a first communications session between said first logical unit in said first logical device and an additional logical unit in said other logical device; and establishing a second communications session between said additional logical unit in said other logical device and a logical unit in said second logical device.

9. The method of claim 8 wherein said existing communications session is with said logical unit in said second logical device.

10. A system for communicating between a plurality of loosely coupled processors and a remote logical device over a communications network having a communications protocol, said loosely coupled processors and said remote logical device being interconnected via said network, the system comprising:

means for initiating a request from one of said plurality of loosely coupled processors to communicate over said network with said remote logical device;

means responsive to said request for identifying any other of said plurality of loosely coupled processors having an existing communications session over said network with said remote logical device;

means responsive to the failure to identify another of said plurality of loosely coupled processors having an existing communications session with said remote logical device for establishing direct communications between said one of said plurality of loosely coupled processors and said remote logical device; and means responsive to the identification of another of said plurality of loosely coupled processors having an existing communications session with said remote logical device for communicating over said network between said one of said plurality of loosely coupled processors and said remote logical device by relaying communications through said other of said plurality of loosely coupled processors.

11. The system of claim 10 wherein said means for identifying comprises:

storage means for storing a session data record containing information on communications sessions between each of said plurality of processors and said remote logical devices;

means for testing said storage means to determine whether an active communication session exists between one of said plurality of processors and said remote logical device; and means for identifying which of said plurality of processors has an existing session.

12. The system of claim 10 wherein said means for communicating comprises:

transaction program means in each of said plurality of processors for servicing communications requests between said plurality of processors; and means for establishing a communications conversation between a transaction program means in said requesting processor and a transaction program means in said other of said plurality of processors for relaying messages between said requesting processor and said remote logical device.

13. The system of claim 10 wherein said request originates from a first logical unit in said one of said plurality of loosely coupled processors and said existing communications session is with another logical unit in said other of said plurality of loosely coupled processors, said first logical unit and said other logical unit having a common logical unit name.

14. The method of claim 13 wherein said communicating means comprises:

means for establishing a first communications session between said first logical unit in said one of said plurality of loosely coupled processors and an additional logical unit in said other of said plurality of loosely coupled processors; and means for establishing a second communications session between said additional logical unit in said other of said plurality of loosely coupled processors and a logical unit in said remote logical device.

15. The method of claim 14 wherein said existing communications session is with said logical unit in said remote logical device.

16. A computer program product having a computer readable medium having computer program logic recorded thereon for establishing communications over a network between one of a plurality of loosely coupled processors and a remote logical device, said loosely coupled processors and said remote logical device being interconnected by said network, the computer program product comprising:

means for initiating a request from one of said plurality of loosely coupled processors to communicate over said network with said remote logical device;

means responsive to said request for identifying any other of said plurality of loosely coupled processors having an existing communications session over said network with said remote logical device;

means responsive to the failure to identify another of said plurality of loosely coupled processors having an existing communications session with said remote logical device for establishing direct communications between said one of said plurality of loosely coupled processors and said remote logical device; and means responsive to the identification of another of said plurality of loosely coupled processors having an existing communications session with said remote logical device for communicating over said network between said one of said plurality of loosely coupled processors and said remote logical device by relaying communications through said other of said plurality of loosely coupled processors.

17. The computer program product of claim 16 wherein said means for identifying comprises:

storage means for storing a session data record containing information on communications sessions between each of said plurality of processors and said remote logical devices;

means for testing said storage means to determine whether an active communications session exists between one of said plurality of processors and said remote logical device; and means for identifying which of said plurality of processors has an existing session.

18. The computer program product of claim 16 wherein said means for communicating comprises:

transaction program means in each of said plurality of processors for servicing communications requests between said plurality of processors; and means for establishing a communications conversation between a transaction program means in said requesting processor and a transaction program means in said other of said plurality of processors for relaying messages between said requesting processor and said remote logical device.

19. The computer program product of claim 16 wherein said request originates from a first logical unit in said one of said plurality of loosely coupled processors and said existing communications session is with another logical unit in said other of said plurality of loosely coupled processors, said first logical unit and said other logical unit having a common logical unit name.

20. The method of claim 19 wherein said communicating means comprises:

means for establishing a first communications session between said first logical unit in said one of said plurality of loosely coupled processors and an additional logical unit in said other of said plurality of loosely coupled processors; and means for establishing a second communications session between said additional logical unit in said other of said plurality of loosely coupled processors and a logical unit in said remote logical device.

21. The method of claim 20 wherein said existing communications session is with said logical unit in said remote logical device.

* * * * *